(12) United States Patent
Keski-Mattinen

(10) Patent No.: US 6,405,025 B1
(45) Date of Patent: Jun. 11, 2002

(54) METHOD FOR SELECTING THE FREQUENCY RANGE IN RADIO COMMUNICATION DEVICES OPERATING IN SEVERAL FREQUENCY RANGES AND A RADIO COMMUNICATION DEVICE

(75) Inventor: Seppo Keski-Mattinen, Salo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/206,490

(22) Filed: Dec. 7, 1998

(30) Foreign Application Priority Data

Dec. 9, 1997 (FI) .............................. 974460 U

(51) Int. Cl.[7] .................................................. H04B 1/44
(52) U.S. Cl. ........................... 455/266; 455/78; 455/86; 455/89; 455/343
(58) Field of Search .............................. 455/266, 200.1, 455/343, 553

(56) References Cited

U.S. PATENT DOCUMENTS

| | | | |
|---|---|---|---|
| 4,039,947 A | * 8/1977 | Miedema ........................ 455/8 |
| 5,194,826 A | 3/1993 | Huusko ........................ 330/302 |
| 5,228,074 A | * 7/1993 | Mizikovsky ................... 455/553 |
| 5,241,284 A | 8/1993 | Nyqvist et al. .............. 330/297 |
| 5,276,917 A | * 1/1994 | Vanhanen et al. ............ 455/95 |
| 5,303,404 A | 4/1994 | Kivela ...................... 455/200.1 |
| 5,396,657 A | 3/1995 | Jokinen ....................... 455/307 |
| 5,422,931 A | * 6/1995 | Austin-Lazarus et al. ... 455/553 |
| 5,491,832 A | 2/1996 | Malkamaki et al. ....... 455/33.1 |
| 5,584,056 A | * 12/1996 | Kim ............................ 455/572 |
| 5,701,106 A | 12/1997 | Pikkarainen et al. ........ 332/100 |
| 5,722,053 A | * 2/1998 | Kornfeld et al. .............. 455/86 |
| 5,764,692 A | 6/1998 | Mucke ........................ 375/216 |
| 5,867,771 A | * 2/1999 | Ruitenburg .................. 455/86 |
| 5,881,369 A | * 3/1999 | Dean et al. .................... 455/78 |

FOREIGN PATENT DOCUMENTS

| | | |
|---|---|---|
| EP | 0 813 312 A2 | 12/1997 |
| WO | WO 96/10871 | 4/1996 |

OTHER PUBLICATIONS

Finnish Official Action.

* cited by examiner

*Primary Examiner*—Daniel Hunter
*Assistant Examiner*—Alan T. Gantt
(74) *Attorney, Agent, or Firm*—Perman & Green, LLP

(57) ABSTRACT

The invention relates to a method for filtering radio frequency signals in so called multiband radio communication devices that operate in several frequency ranges and to a communication device operating in several frequency ranges. In the method according to the invention, the desired frequency range is selected so that of the amplifiers (62a, 62b, 62c; 72a, 72b, 72c) placed between the filters (61, 63) on the reception branch (11) or correspondingly between the filters (71, 73) on the transmission branch (12) the amplifiers that control the desired signal paths are activated.

8 Claims, 5 Drawing Sheets

METHOD FOR SELECTING THE FREQUENCY RANGE IN RADIO COMMUNICATION DEVICES OPERATING IN SEVERAL FREQUENCY RANGES AND A RADIO COMMUNICATION DEVICE

BACKGROUND OF THE INVENTION

1. Field of the Invention

The invention relates to a method according to the preamble of claim 1 for selecting the frequency range in radio communication devices operating in several frequency ranges, so called multiband radio communication devices.

The invention also relates to a multiband radio communication device.

2. Description of the Prior Art

Of the existing digital cellular networks, the GSM (Global System for Mobile telecommunications) is the most extensively used at the moment. Because the networks suffer from congestion, the GSM system, which originally had an operating frequency of 900 MHz, has been extended to 1.8 GHz. There are also cellular networks of other standards widely used in the world. Because the mobility of people and communications between people are increasing, there is a need for combined telephones, which operate on several different networks, depending on which network is available and/or which network offers services to the users at the lowest price.

In addition, in the so called third generation cellular systems (UMTS/FLPMTS, Universal Mobile Telecommunication System/Future Public Land Mobile Telecommunication System) it is possible to use several frequency ranges within the same system. Because of these reasons, efforts have been made to develop radio communication devices which can operate in several different frequency ranges and/or in network systems of different standards. In order to simplify the explanation, the frequency ranges used by different systems are handled in this patent application as if they were always different frequency ranges, although in some cases it is possible that different systems use the same frequency ranges.

In radio communication devices operating in many different frequency ranges, the duplexing and multiple access methods of different systems must be matched. Duplexing means separating communications in the transmit and receive direction from each other in a data transfer connection between two transceiver devices. Common methods are Time Division Duplexing (TDD) and Frequency Division Duplexing (FDD). Multiple access means dividing the capacity of the system or a part of it (such as a base station) between many terminal devices (such as radio communication devices). Common methods are Time Division Multiple Access (TDMA), Frequency Division Multiple Access (FDMA) and Code Division Multiple Access (CDMA). In addition, different multiplexing methods are applied in the systems, whereby one device directs information received from several sources to a common transfer channel and separates the transmissions from one another e.g. by Time Division Multiplexing (TDM) or Frequency Division Multiplexing (FDM), for example.

A prior art radio communication device operating in two directions by time or frequency division multiplexing contains many RF and intermediate frequency filters both on the transmit (TX) and receive (RX) side. FIG. 1 shows a prior art GSM communication device 100. In the GSM system, the transmission and reception take place in different time slots and at different frequencies. The communication device 100 includes the receiver (RX) branch 11 and the transmitter (TX) branch 12. The selection of whether the communication device operates in the reception state or the transmission state can be performed by means of an antenna switch (not shown) placed e.g. between the inputs of the branches 11 and 12 and the antenna 21, whereby the selected branch is connected to the antenna 21. The antenna switch that connects the antenna to the transmitter branch 11 and the receiver branch 12 in turn, is used in radio communication devices for separating the signals if the system has time division duplexing (TDD). If the transmission and reception take place in different frequency ranges, a filter 22 like the duplex filter used in analog telephones can be used as the separating unit, as in the solution shown in FIG. 1.

The duplex filter 22 is a circuit device with three gates, comprising a reception branch filter 22RX between the antenna and reception gate and a transmission branch filter 22TX between the transmitter and antenna gate. The operating frequencies of the filters have been selected so that a transmission frequency signal does not get to the receiver gate and a reception frequency signal does not get to the transmission gate. The frequency properties of the filters can be adjustable.

On the reception side 11, the GSM communication device 100 includes a Low Noise Amplifier (LNA) 32, the input gate of which is connected to the duplex filter 22. The amplifier 32 is followed by a bandpass filter 33, which filters the received signal. The output gate of the filter 33 is connected to a mixer 34, in which the received signal is mixed with the first mixing signal coming from the synthesizer 23. The intermediate frequency signal produced as the mixing result is directed to the RF circuit 35 of the receiver for further processing.

The signal 45 produced in the transmitter part 12 of the communication device 100 at the pre-stage of the transmitter (not shown) is mixed in the mixer 44 with the first mixing signal. The output of the mixer 44 is taken to the bandpass filter 43, which is generally situated before the power amplifier 42 of the transmitter. The output of the power amplifier 42 is coupled through the duplex filter 22 to the antenna 21. Between the power amplifier 42 and the duplex filter 22 there is often a directional coupler (not shown), by which the power level of the signal going to the antenna can be measured.

FIG. 2 shows a prior art dual mode radio communication device 200 operating in two different frequency ranges as an example of multiband radio communication devices operating in several frequency ranges. In the radio communication device 200, both frequency ranges share the same antenna 21. An antenna switch 50 connects the shared antenna 21 to the component chain (a or b) forming the desired transmitter-receiver according to the frequency range used. The operations of the selected component chain are mainly the same as shown in FIG. 1 and in the case of the component chain a they comprise a duplex filter 22a and in the reception branch RXa an amplifier 32a and a bandpass filter 33a, and in the transmission branch TXa a bandpass filter 43a and a power amplifier 42a. Correspondingly, when another frequency range/system is used, the components being used are the duplex filter 22b and the signal path going through the amplifier 32b of the reception branch RXb and the filter 33b, or the signal path going through the filter 43b of the transmitter branch TXb and the amplifier 42b.

Switch 51 on the reception side and switch 52 on the transmission side operate synchronously with the antenna switch 50 and connect the selected transmission and reception branches via mixers 34 and 44 to the common modulation and demodulation components of a dual mode telephone, and through them to other components of the communication device.

The prior art solution shown in FIG. 2 above has the problem of attenuation in the switches 50, 51, 52 and in the duplex filters 22a and 22b.

SUMMARY OF THE INVENTION

An object of the invention is to provide a new method for selecting the frequency range of a radio communication device that operates i.e. transmits and/or receives in at least two different frequency ranges.

Another object of the invention is to provide a new radio communication device, especially a new mobile station.

A method according to the invention for selecting one of the frequency ranges of a radio communication device operating in at least two different frequency ranges, comprises the step of activating an amplifier in a signal path corresponding to said frequency range among the group of the amplifiers placed in the signal paths of a signal branch of the radio communication device. In a preferred embodiment of the invention the activating of said amplifier is produced by switching on the amplifier.

Another method according to the invention for selecting the frequency range of a radio communication device such as a radio transceiver transmitting and receiving in at least two different frequency ranges, comprises the step of activating the first amplifier among the first group of the amplifiers placed in the reception branch of the radio communication device which first amplifier is located in a signal path corresponding to said frequency range and activating the second amplifiers among the second group of the amplifiers placed transmission branch of the radio communication device which second amplifier is located in a signal path corresponding to said frequency range. In a preferred embodiment of the invention the activating of said first and second amplifiers is produced by switching on the amplifiers.

Another advantageous method according to the invention for selecting the frequency range of a radio communication device operating in at least two different frequency ranges, comprises the step of directing an input signal in a signal branch containing the desired information to the first group of bandpass filters, separating each frequency range to its own signal path by means of the first group of bandpass filters, selecting the desired frequency range and the signal path by activating an amplifier among the group of amplifiers arranged in the signal paths after the first group of bandpass filters which amplifier corresponds to the desired frequency range, directing the signals of different signal paths received from the group of amplifiers to the second group of bandpass filters, and recombining the signals from different signal paths after the second group of bandpass filters into an output signal.

A radio communication device according to the invention operating at least two different frequency ranges comprises a group of the amplifiers placed in a signal branch of the radio communication device, and a selecting means for selecting one of the frequency ranges having an activating means for activating an amplifier among said group of the amplifiers in a signal path of the signal branch corresponding to said frequency range. In a preferred embodiment the activating means comprises an actuator unit for switching on and off said amplifier.

Another radio communication device according to the invention operating at least two different frequency ranges comprises successively in a signal branch of the device: a first group of bandpass filters; a group of the amplifiers; and a second group of bandpass filters; which filters in the first and second group of filters and the amplifiers are arranged so that parallel signal paths for each frequency ranges are defined, which device further comprises a selecting means for selecting one of the frequency ranges having an activating means for activating an amplifier among said group of the amplifiers in the signal path corresponding to said frequency range.

Another advantageous radio communication device such as a radio transceiver according to the invention operating at least two different frequency ranges having a reception branch for receiving radio signals in one of the frequency ranges and a transmission branch for transmitting radio signals in the same frequency range as receiving radio signals which device comprises in the reception branch; a first group of bandpass filters; a first group of amplifiers; and a second group of bandpass filters which device further comprises in the transmission branch; a third group of bandpass filters; a second group of amplifiers; and a fourth group of bandpass filters; which filters in the first and second group of filters and the first group of amplifiers are arranged so that parallel signal paths for each frequency ranges are defined, and which filters in the third and fourth group of filters and the second group of amplifiers are arranged so that parallel signal paths for each frequency ranges are defined, which device further comprises a selecting means for selecting one of the frequency ranges having an activating means for activating an amplifier in the reception and transmission branch among said first and second group of the amplifiers in the signal path corresponding to said frequency range.

The preferred embodiments of the invention are described in the dependent claims.

In contrast to the prior art, by the solution according to the invention it is possible to implement the selection of signals of the desired frequency range without the switches 51 and 52 (FIG. 2). Because of this, a method and a radio communication device according to the invention achieves higher signal levels compared to the prior art. Due to the achieved higher signal levels, less current is needed to achieve the same transmission power, which is seen as reduced current consumption of the radio communication device. Due to reduced losses, sensitivity on the reception side 11 becomes better.

In addition, a method and a radio communication device according to the invention simplifies the selection of the frequency range, which makes the structure of the radio communication device simpler and reduces the manufacturing costs.

BRIEF DESCRIPTION OF THE DRAWINGS

In the following, the invention will be described in more detail with reference to the accompanying drawings, in which.

DESCRIPTION OF THE PREFERRED EMBODIMENT(S)

Figure 1:
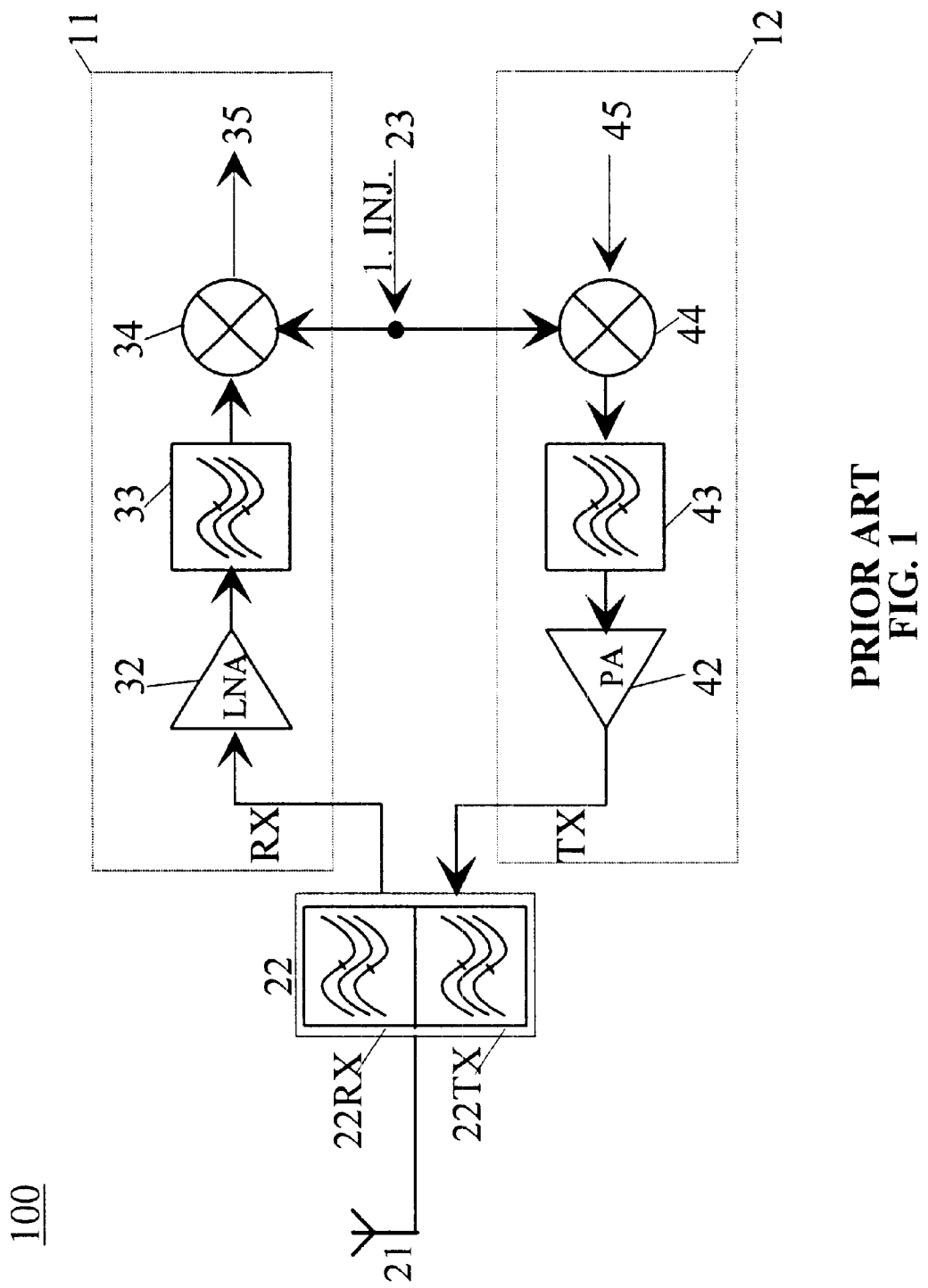
FIG. 1 shows a prior art GSM radio communication device.
Figure 2:
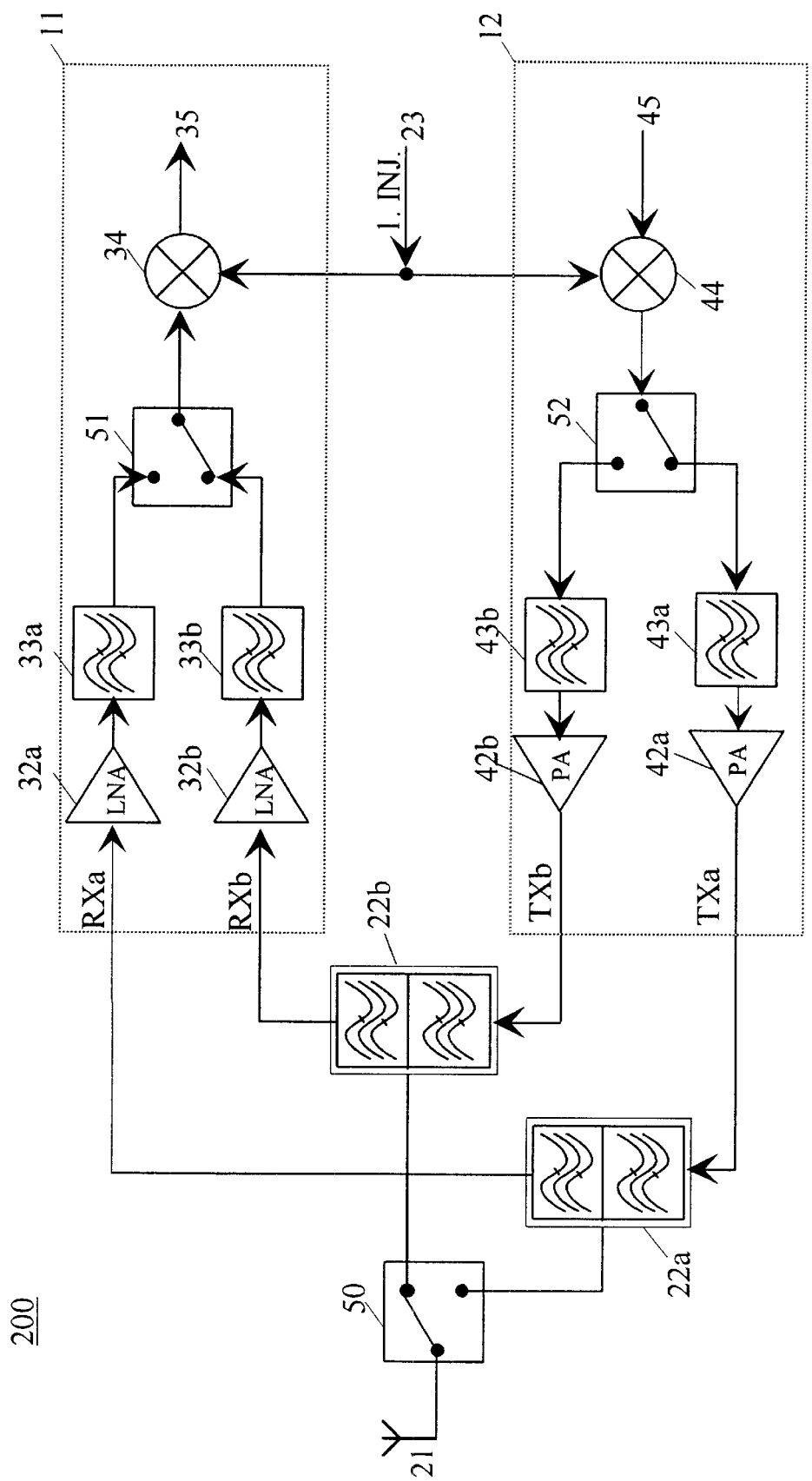
FIG. 2 shows a prior art dual mode radio communication device.

FIGS. 1 and 2 have been dealt with above in connection with the prior art description.

Figure 3:
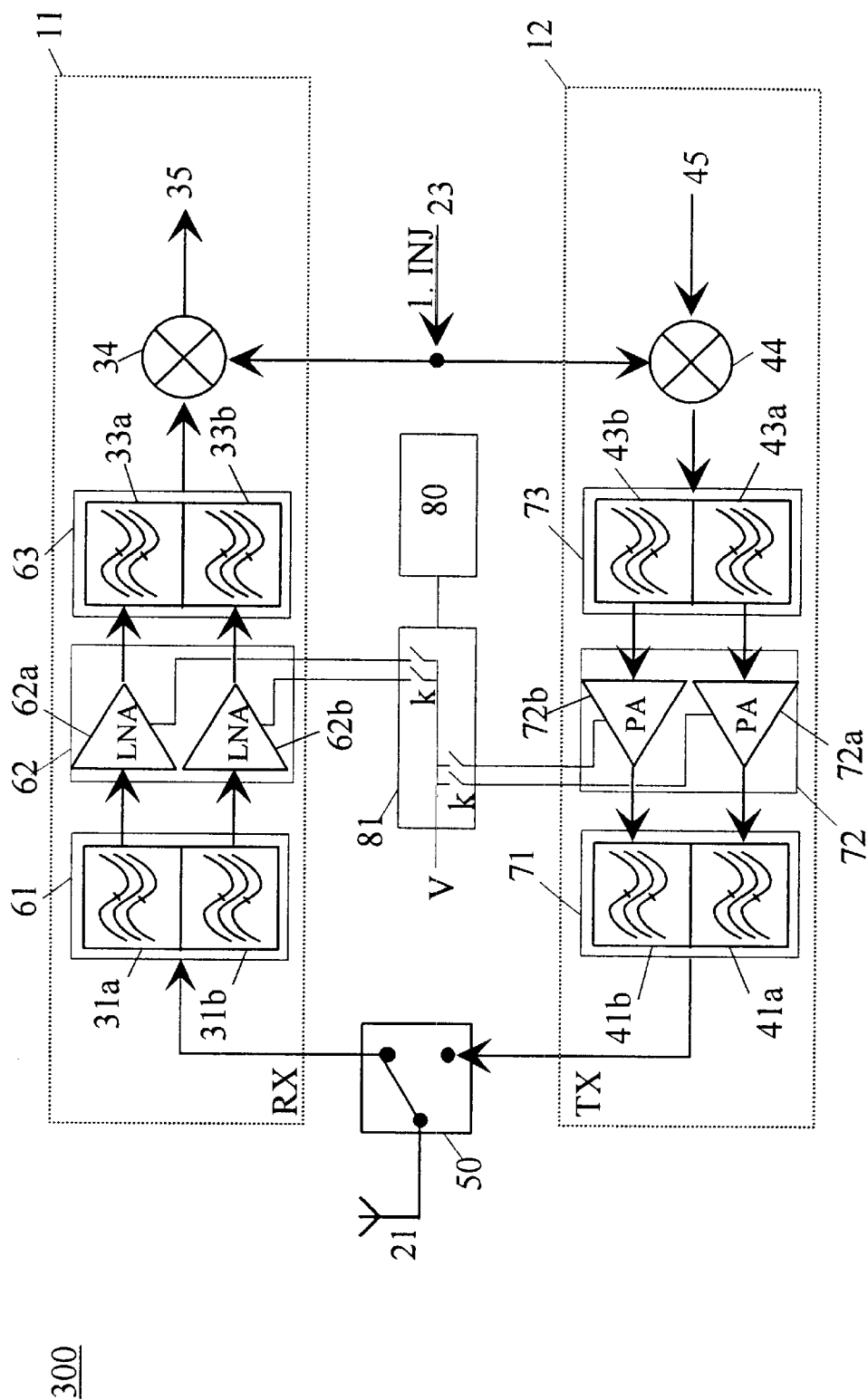
FIG. 3 shows a dual mode radio communication device according to the invention.

FIG. 3 shows a radio communication device 300, such as a GSM mobile station, which has been implemented using the method of the invention and which transmits and receives in two different frequency ranges. The radio communication device has two signal branches i.e. a reception branch 11 and a transmission branch 12. In the communication device 300, the antenna 21 is connected during reception by switch 50 to the reception branch 11, which consists of a first group of filters 61, a first group of amplifiers 62, a second group of filters 63 and a mixer 34. During transmission, the input signal is directed in the transmission branch 12 from the mixer 44 to the third group of filters 73, and via a second group of amplifiers 72 i.e. the power amplifiers 72a and 72b to the fourth group of filters 71 and further via switch 50 to the antenna 21.

In the reception branch 11, the input signal coming via switch 50 is directed to the first group of filters 61. In this case we have two filters 31a and 31b in the first group of filters 61, which filters are preferably realized with the first filter package (band filter) 61, in which the first bandpass filters 31a and 31b limiting the selected reception frequency are integrated.

Figure 4:
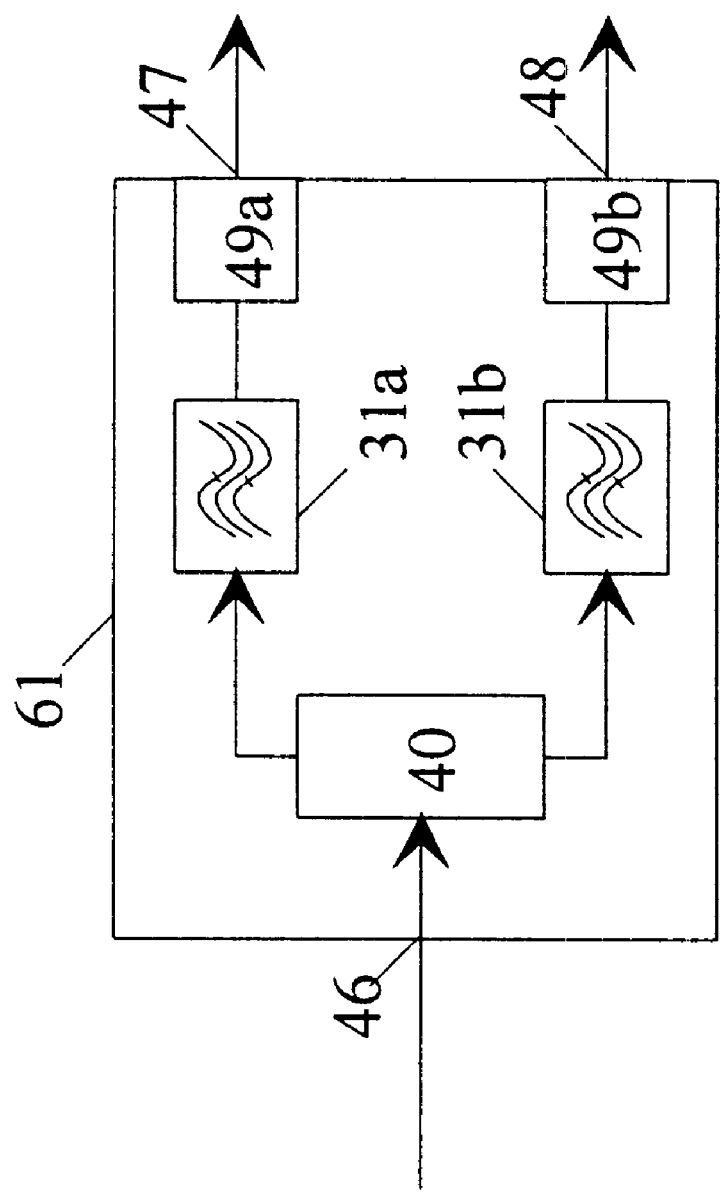
FIG. 4 shows the structure of the filter package.

FIG. 4 shows the structure of the filter package 61 in more detail. The filter package has one input gate 46 and separate output gates 47 and 48 for both signal paths a and b. If the direction of the signal were changed, the gates 47 and 48 would operate as inputs and the gate 46 as output (as we have in the second group of filters 63). There could also be more filters, whereby the filter package 61 would also have a number of outputs (or inputs, if the signal direction is opposite to that shown in FIG. 4) equal to the number of filters, but still only one input (or output).

A filter package cannot be implemented only by connecting the inputs or outputs of different filters together, because impedance matching is required between the filters so as different branches would not have an effect on the properties of other branches. Impedance matching can be carried out in a controlled manner in connection with the integration process by means of the first matching circuit 40 that is included in the filter package.

The first group of filters and in this case the first filter package 61 has two outputs, through the first of which a signal of the first reception frequency obtained from the bandpass filter 31a is directed to a low noise amplifier (LNA) 62a, from which the signal is preferably directed further to the input of the filter 33a of the second group of filters and in this case the second filter package 63. Similarly, a signal of the second reception frequency is directed from the output of the filter 31b of the first filter package 61 through the amplifier 62b to the input of the filter 33b of the second filter package 63. The second filters 33a and 33b have preferably been implemented with the second filter package 63, in which the second bandpass filters 33a and 33b are integrated. We have then two signal paths in the reception branch.

The output and input impedances of separate filters are typically 50 ohms in high frequency technology. The filter package solution makes it possible to optimize the impedance levels according to the purpose of use. This means that the input and output matching of the amplifiers 62a and 62b between the filter packages 61 and 63 can be carried out partly or entirely by means of the second matching circuits 49a and 49b in the filter package. In the case shown in FIG. 3 for instance, the impedances of the output gates of the filter package 61 can, when necessary, differ from the 50 ohm impedance so that the input of the LNA circuits 62a and 62b receive impedances by which the properties of the LNA circuits, such as the noise figure, gain and stability can be more easily optimized. Correspondingly, the impedances of the input gates of the filter package 63 can be optimized to suit the output of the LNA circuits 62a and 62b. Similar optimization can also be carried out in third and fourth group of filters i.e. the filter packages 71 and 72 of the transmitter branch 12 with regard to the second group of amplifiers 72, i.e. the power amplifiers 72a and 72b.

Of the first group of filters 61;31a, 31b and of the second group of filters 63;33a, 33b, the filters of the same signal path, 31a and 33a, as well as 31b and 33b, are preferably substantially similar. In this case, the first group of filters 61 and the second group of filters 63 are also mutually similar and they can thus be realized with similar components, which simplifies the construction of the radio communication device.

In the second group of filters such as the filter package 63, the signals received from the second group of amplifiers 62 i.e. the amplifiers 62a and 62b are combined into one output signal, which is directed through the mixer 34 to the RF circuit 35 of the communication device for further processing.

In the solution according to the invention, the selection of the reception frequency range is performed by means of the control unit 80. The control unit 80 controls the actuators placed in the actuator unit 81, such as the switches k. The actuators have been connected to the first group of amplifiers 62, i.e. the amplifiers 62a and 62b so that they can be used to bring the desired amplifier into operation. The connection has been implemented for instance so that the actuators in the actuator unit 81 switch, under the control of the control unit 80, the operating potential voltage V, such as current supply or bias voltage to the selected amplifier.

When the reception frequency range defined by the signal path a running through first filter 31a of the first filter group 61, first amplifier 62a of the first group of amplifiers 62 and first filter 33a of the second filter group 63 is selected to reception, the control unit 80 guides the actuator unit 81 to activate the first amplifier 62a of the first group of amplifiers 62. The second amplifier 62b of the first group of amplifiers 62 that amplifies the second reception frequency range is inactivated by the control unit 80 for instance so that it causes an actuator of the actuator unit 81 to switch off the operating voltage V or current supply to said amplifier 62b, effectively preventing the run of the signal from the second filter 31b of the first filter group 61 to the second filter 33b of the second filter group 63. It follows from this that in the second filter group 63, the output signal to be combined and sent to the mixer 34 consists only of the signal transferred via the first active amplifier 62a of the first group of amplifiers 62. Correspondingly, when the second amplifier 62b of the first group of amplifiers 62 is activated and said first amplifier 62a inactivated, the signal sent to the mixer 34 only consists of the signal transferred via said second amplifier 62b.

The amplifiers 62a and 62b of the first group of amplifiers 62 can also be used to achieve an automatic level adjustment function. Level adjustment is carried out so that the control unit 80 guides the actuators of the actuator unit 81 to switch off the amplifier of the active signal branch in a situation in which the level of the received signal is high. Then the inactive amplifier attenuates the level of the received signal to be suitable for the end part of the receiver.

By means of the switching arrangement of the invention shown in FIG. 3, compared to the prior art, the selection of the frequency range can be carried out entirely without the switches 51, 52 and duplex filters 22a, 22b shown in FIG. 2. The arrangement according to the invention avoids the signal attenuation caused by the switches 51, 52 and the duplex filters 22a, 22b, with the result that sensitivity in the reception branch 11 is improved, and less current is needed on the transmitter side to achieve the same transmission power.

The arrangement according to the invention can also be applied to the transmitter branch 12 of the communication device, as shown in FIG. 3. The input signal received from the mixer 44 is led to the third filter group 73 in this case comprising two bandpass filters 43a and 43b. From the outputs of the bandpass filters 43a and 43b, the signals are led through the second group of amplifiers 72, in this case the power amplifiers 72a and 72b, to the fourth filter group 71 and further through the switch 50 to the antenna 21.

The second group of amplifiers 72, the power amplifiers 72a and 72b, are connected to the actuator unit 81, and by means of the actuators contained by it, the control unit 80 connected to the actuator unit 81 brings the selected amplifier into operation, as was described above in connection with the first group of amplifiers 62, the amplifiers 62a and 62b of the reception branch.

Unlike in the reception branch, the third 73 and fourth filter groups 71 on the transmission branch are typically given differing requirements, for which reason the filters 41a and 43a as well as the filters 41b and 43b in the same signal path preferably have differing qualities.

Figure 5:
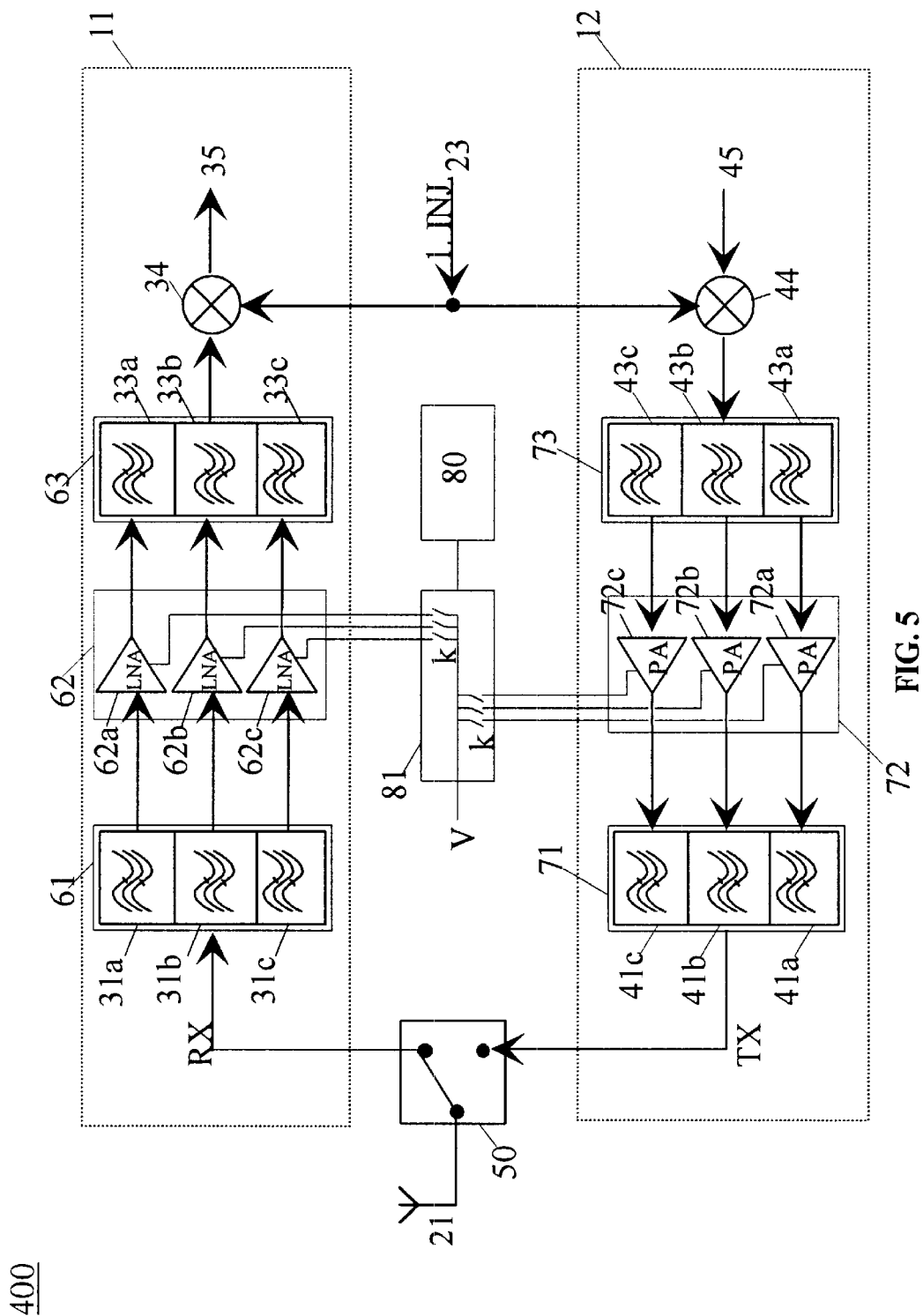
FIG. 5 shows a radio communication device according to the invention, which operates in three different frequency/system domains.

FIG. 5 shows a radio communication device 400 based on three transmission and reception ranges, implemented with the method of the invention. The operation of the radio communication device 400 is essentially the same as that of the radio communication device 300 described above. The only difference is that in the radio communication device 400 the filter groups (and preferably filter packages) 61, 63, 71 and 73 each contains three filters, preferably bandpass filters, 31a, 31b, 31c; 33a, 33b, 33c; 41a, 41b, 41c; 43a, 43b, 43c, which filter the given signal in three frequency ranges, and that the amplifiers 62c and 72c have been added by the side of the amplifiers 62a, 62b and 72a, 72b, respectively. Thus the radio communication device 400 gets three alternative signal paths a, b, c, for a signal branch whereas the radio communication device 300 only had two alternative signal paths a, b.

The run of the signal in the radio communication device 400 is to a large extent similar to that in the radio communication device 300. The input signal coming from the antenna 21 is led during reception via the switch 50 to the reception branch 11. The filters 31a, 31b, 31c of the first filter group 61 each filter a frequency range corresponding to one reception frequency range. The outputs corresponding to the filters 31a, 31b, 31c of the first filter group 61 have each been connected to a corresponding amplifier 62a, 62b, 62c of the first group of amplifiers, the operation of which is regulated by means of the actuator unit 81 controlled by the control unit 80. By means of the actuators k of the actuator unit 81, the reception frequency range used at any given time is selected by switching on the amplifier corresponding to the selected reception frequency, while at the same time the amplifiers of other signal paths are switched off by means of the actuators k.

Each of the amplifiers 62a, 62b, 62c in the first group of amplifiers 62 have further been connected by means of the second filter group 63 to the input of the corresponding filter 33a, 33b, 33c. The second filter group 63 is used to combine the signals coming from the amplifiers 62a, 62b, 62c after the second filter group 63 i.e. the filters 33a, 33b, 33c into one output signal, which is directed to the mixer 34.

Correspondingly on the transmission branch 12, the input signal received from the mixer 44 is filtered by the filters 43a, 43b, 43c contained by the third filter group, preferably the package 73, so that each transmission frequency range is directed to the corresponding power amplifiers 72a, 72b, 72c of the second group of amplifiers 72, the operation of which amplifiers is regulated by means of the actuator unit 81 controlled by the control unit 80. By means of the actuators k of the actuator unit 81, the reception frequency range used at any given time is selected by switching on the amplifier of the signal path corresponding to the selected reception frequency, while at the same time the amplifiers of other signal paths are switched off by means of the actuators k.

Each of the amplifiers 72a, 72b, 72c of the second group of amplifiers 72 have further been connected by means of the fourth filter group, preferably the package 71, to the input of the corresponding filter 41a, 41b, 41c. The fourth filter group, preferably the package 71, is used to combine the signals coming from the amplifiers 72a, 72b, 72c after the filters 41a, 41b, 41c into one signal, which is directed via the switch 50 to the antenna 21.

The filter arrangement according to the invention does not limit the number of frequency ranges used to three, because if there is a need to increase the number of the transmission and reception ranges, the increase can be carried out by increasing the number of filters operating in the desired frequency ranges in the filter groups 61, 63, 71 and 73 and the number of amplifiers in the first and second groups of amplifiers 62, 72 according to need.

The control of the amplifiers by means of the actuator unit 81 described above can also be implemented in a manner such that the amplifiers 62a, 62b, 62c, 72a, 72b, 72c have a control input, the state of which determines whether the amplifier is active or inactive.

In that case, the control of the amplifiers 62a, 62b, 62c, 72a, 72b, 72c can be implemented by connecting the actuator unit 81 to the control input of the amplifiers.

The control of the amplifiers can also be implemented by controlling by means of the actuator unit 81 the bias voltage of the amplifiers 62a, 62b, 62c, 72a, 72b, 72c according to which of the amplifiers 62a, 62b, 62c, 72a, 72b, 72c should be switched on or of The filtering taking place in the radio communication devices 300 and 400 described above has been realized by the filter packages 61, 63, 71, 73. The filter packages 61, 63, 71, 73 can be replaced by filter groups consisting of separate filters, in which a filter group corresponding to each filter package 61, 63, 71, 73 would consist of filters with the same filtering properties as the filters 31a, 31b, 31c; 33a, 33b, 33c; 41a, 41b, 41c; 43a, 43b, 43c of the filter package in question.

Some embodiments of the method and communication device according to the invention have been described in detail above, but the invention is not limited to these embodiments but it can vary within the scope defined by the attached claims.

We claim:

1. A radio communication device such as a radio transceiver operating at least two different frequency ranges having a reception branch for receiving radio signals in one of the frequency ranges and a transmission branch for transmitting radio signals in the same frequency range as receiving radio signals, which device comprises:

an antenna and a duplexing means for separating reception and transmission modes of operation and which device further comprises in the reception branch:

a first group of bandpass filters, a first group of amplifiers, a second group of bandpass filters and a first mixer, which filters in the first and second group of filters and the first group of amplifiers are arranged so that parallel signal paths for each frequency ranges are defined and where, during reception, a first input signal via the switch is directed to the first group of bandpass. filters and via the first group of amplifiers to the second group of bandpass filters, where a first output signal is directed through the first mixer to a RF circuit of the communication device for further processing, which device further comprises in the transmission branch:

a second mixer, a third group of bandpass filters, a second group of amplifiers and a fourth group of bandpass filters, which filters in the third and fourth group of filters and the second group of amplifiers are arranged so that parallel signal paths for each frequency ranges are defined and where, during transmission, a second input signal is directed through the second mixer to the third group of bandpass filters and via the second group of amplifiers to the fourth group of bandpass filters and further as a second output signal via the switch to the antenna which device further comprises:

a selecting means for selecting one of the frequency ranges by activating an amplifier in the reception and transmission branch among said first and second group of amplifiers in the signal path corresponding to said frequency range.

2. A radio communication device according to claim 1 in which the actuator unit comprises a group of actuators such as switches by which the amplifiers are switched on and off.

3. A radio communication device according to claim 1, which comprises a control unit for controlling the actuators of said actuator unit.

4. A radio communication device according to claim 1 in which the first group of bandpass filters are produced as a first filter package wherein the individual filters have been integrated which first filter package have an input for input signals and a group of outputs separating the incoming signal to one of the frequency ranges and to the respective signal path to each of which outputs one amplifier of the first group of amplifiers is connected;

the second group of bandpass filters are produced as a second filter package wherein the individual filters have been integrated which second filter package have a group of inputs corresponding to the signal paths to each of which inputs one amplifier of the first group of amplifiers is connected and an output for output signals for reception;

the third group of bandpass filters are produced as a third filter package wherein the individual filters have been integrated which third filter package have an input for input signals and a group of outputs separating the incoming signal to one of the frequency ranges and to the respective signal path to each of which outputs one amplifier of the second group of amplifiers is connected; and the fourth group of bandpass filters are produced as a fourth filter package wherein the individual filters have been integrated which fourth filter package have a group of inputs corresponding to the signal paths to each of which inputs one amplifier of the second group of amplifiers is connected and an output for output signals for transmission.

5. A radio communication device according to claim 1 in which the filter groups and the amplifier groups consist of two parallel filters and amplifiers respectively and have two parallel signal paths.

6. A radio communication device according to claim 1 in which the filter groups and the amplifier groups consist of three parallel filters and amplifiers respectively and have three parallel signal paths.

7. A radio communication device, according to claim 1, wherein the duplexing means comprises a filter.

8. A radio communication device, according to claim 1, wherein the duplexing means comprises a switch.

* * * * *